(12) United States Patent
Salu et al.

(10) Patent No.: US 10,370,599 B2
(45) Date of Patent: Aug. 6, 2019

(54) METHODS AND SYSTEMS FOR OPTIMIZING DEMULSIFIER AND WASH WATER INJECTION RATES IN GAS OIL SEPARATION PLANTS

(71) Applicant: Saudi Arabian Oil Company, Dhahran (SA)

(72) Inventors: Samusideen Adewale Salu, Ras Tanura (SA); Mohamed A. Soliman, Ras Tanura (SA); Talal A. Zahrani, Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 274 days.

(21) Appl. No.: 15/399,840

(22) Filed: Jan. 6, 2017

(65) Prior Publication Data

US 2018/0195010 A1 Jul. 12, 2018

(51) Int. Cl.
| | | |
|---|---|---|
| C10G 33/04 | (2006.01) | |
| B01D 17/04 | (2006.01) | |
| B01D 17/12 | (2006.01) | |
| C10G 31/08 | (2006.01) | |
| C10G 33/08 | (2006.01) | |

(52) U.S. Cl.
CPC ........... *C10G 33/04* (2013.01); *B01D 17/047* (2013.01); *B01D 17/12* (2013.01); *C10G 31/08* (2013.01); *C10G 33/08* (2013.01)

(58) Field of Classification Search
CPC ........ C10G 33/04; C10G 33/08; C10G 31/08; B01D 17/047; B01D 17/12
See application file for complete search history.

(56) References Cited

U.S. PATENT DOCUMENTS

| | | |
|---|---|---|
| 3,256,902 A | 6/1966 | Porter |
| 3,778,025 A | 12/1973 | Lane et al. |
| 3,796,318 A | 3/1974 | Underwood |
| 3,856,677 A | 12/1974 | Peters |
| 4,197,576 A | 4/1980 | Sanchez |
| 4,538,221 A | 8/1985 | Crain |

(Continued)

FOREIGN PATENT DOCUMENTS

| | | |
|---|---|---|
| CA | 1184865 A | 4/1985 |
| SU | 1278357 A1 | 12/1986 |

OTHER PUBLICATIONS

International Search Report and Written Opinion for International Application No. PCT/US2018/012451; International Application Filing Date Jan. 5, 2018; Report dated Apr. 12, 2018 (pp. 1-12).

(Continued)

*Primary Examiner* — Shogo Sasaki
(74) *Attorney, Agent, or Firm* — Bracewell LLP; Constance G. Rhebergen; Vivek P. Shankam

(57) ABSTRACT

Control strategy and algorithms to be utilized in a programmable logic control for automating injection rates of demulsifier and wash-water in a Gas-Oil-Separation Plant (GOSP). The logic control system can be programmed on a Distributed Control System (DCS) of the plant. The automating system is developed with the objective of optimizing demulsifier and wash water usage, improving plants water removal efficiency and minimizing process upsets from insufficient injection of demulsifier or wash water.

5 Claims, 12 Drawing Sheets

(56) References Cited

U.S. PATENT DOCUMENTS

| | | | |
|---|---|---|---|
| 4,581,134 | A | 4/1986 | Richter et al. |
| 5,060,167 | A | 10/1991 | Ticcioni |
| 5,353,237 | A | 10/1994 | Bass et al. |
| 5,521,814 | A | 5/1996 | Teran et al. |
| 6,171,480 | B1 | 1/2001 | Lee et al. |
| 6,766,863 | B2 | 7/2004 | Arvidson et al. |
| 6,921,027 | B2 | 7/2005 | Firestone |
| 6,957,577 | B1 | 10/2005 | Firmin |
| 7,261,162 | B2 | 8/2007 | Deans et al. |
| 8,130,106 | B1 | 3/2012 | Hicks et al. |
| 8,398,849 | B2 | 3/2013 | Cross et al. |
| 8,682,589 | B2 | 3/2014 | Thigpen |
| 9,150,793 | B2 | 10/2015 | Scattergood et al. |
| 9,157,035 | B1 | 10/2015 | Ball, IV |
| 9,181,499 | B2 | 11/2015 | Mason et al. |
| 9,255,228 | B2 | 2/2016 | Prasad |
| 2004/0253734 | A1 | 12/2004 | Firmin |
| 2008/0145237 | A1 | 6/2008 | Stricklin |
| 2010/0269996 | A1 | 10/2010 | Grattan et al. |
| 2014/0026085 | A1* | 1/2014 | Amminudin ........ G06F 3/04842 715/764 |
| 2014/0131254 | A1 | 5/2014 | Soliman |
| 2015/0284263 | A1 | 10/2015 | Criswell |
| 2017/0369791 | A1* | 12/2017 | Khan ................... C10G 31/08 |

OTHER PUBLICATIONS

Sunil L. Kokal et al.: "Performance Appraisals of Gas/Oil Separation Plants", Spe Production & Operations : An Official Publication Of The Society of Petroleum Engineers, vol. 23, No. 02, May 1, 2008, pp. 287-296.

* cited by examiner

METHODS AND SYSTEMS FOR OPTIMIZING DEMULSIFIER AND WASH WATER INJECTION RATES IN GAS OIL SEPARATION PLANTS

TECHNICAL FIELD

Example embodiments relate to methods and systems for optimizing demulsifier and wash water injection rate in a gas oil separation plant (GOSP).

BACKGROUND

Raw wild crude produced from wells typically consist of a mixture of gas, liquid hydrocarbons, and salty formation water. In the upstream section of oil and gas industries, the function of a GOSP is to adequately separate gas and salty water from the crude oil to acceptable specifications for easy transportation and for downstream processing. For instance, excessive salt and water in crude oil from GOSP may result in high corrosion in transportation pipeline and refining units and may also have detrimental scaling effects on processing units and on catalysts. As part of the GOSP operation, produced crude oil is separated from associated salty water in a wet crude handling facility (WCHF) comprising of mainly crude dehydrator and desalter vessels. The salty water produced along with the crude often form very tight emulsion with oil that usually require use of demulsifier chemical and wash water to achieve the required specifications. Produced crude oil from most GOSPs must meet basic sediment and water (BS&W) specification of 0.2 v/v % and salt content of less than 10 PTB (pounds per thousand barrels) to be acceptable to most international crude buyers. Currently, in most GOSPs these crude product specifications are monitored manually and periodically determined through laboratory analysis at every 8-hour shift intervals. Similarly, the control of demulsifier and wash water injection rates are presently by manually adjusting the injection pumps strokes at the field.

SUMMARY

Methods and systems for automating injection rates of demulsifiers and wash water in a GOSP are disclosed. The method steps are carried out by a programmable logic control system that can be developed or programmed on a distributed control system (DCS) of the plant. One embodiment is an automated system with the objective of optimizing demulsifier and wash water usage, improving plants water removal efficiency, and minimizing process upsets from insufficient injection of demulsifier or wash water. The control strategy and algorithms used in the methods and systems rely on effective and accurate online analyzers to provide real-time crude product specification data on the plant's DCS in the central control room. Combined application of online crude analyzers with use of electronic capacity control (ECC) chemical injection pump technology that are capable of receiving remote signal to control pump discharge rates via the DCS for demulsifier chemical and wash water injection is required for fully automating control of injection rates from DCS to achieve product specifications at all times. Both continuous online analyzers of product specifications and automating demulsifier and wash water injection may substantially improve performance of GOSP operation and offer several other benefits to the system. An automatic controlled injection system may optimize demulsifier and wash water usage, improve the plants water removal efficiency and minimizes process upsets from insufficient injection.

One example embodiment is a system for optimizing demulsifier injection rate in a GOSP. The system includes a programmable logic controller operatively coupled to a control unit associated with the plant, and a non-transitory computer-readable medium in communication with the programmable logic controller and having stored thereon a set of instructions that when executed cause the programmable logic controller to perform operations comprising reading a demulsifier dosage rate for a crude inlet to the plant, reading a wet crude flow rate for the crude inlet to the plant, reading a first primary demulsifier injection rate for the crude inlet to the plant, reading a current value of basic sediment and water (BS&W) at either a desalter outlet or an export crude outlet of the plant, determining the current value of basic sediment and water (BS&W) is not within a predetermined range, determining a second primary demulsifier injection rate based on the first primary demulsifier injection rate, the demulsifier dosage rate, and the wet crude flow rate, and causing to modify a demulsifier injection pump stroke to inject the demulsifier at the second primary demulsifier injection rate. The instructions further cause the programmable logic controller to perform operations including reading the demulsifier dosage rate for a crude type from a degassing tank, reading the wet crude flow rate for a crude outlet from the degassing tank, reading a first secondary demulsifier injection rate for the degassing tank, reading a current value of basic sediment and water (BS&W) at either a desalter outlet or an export crude outlet of the plant, determining the current value of basic sediment and water (BS&W) is not within a predetermined range, determining a second secondary demulsifier injection rate based on the first secondary demulsifier injection rate, the demulsifier dosage rate, and the wet crude flow rate, and causing to modify a secondary demulsifier injection pump stroke to inject the secondary demulsifier at the second secondary demulsifier injection rate. The instructions further cause the programmable logic controller to perform operations including determining the current value of basic sediment and water (BS&W) is within a predetermined range, and causing to stop injection of secondary demulsifier.

Another example embodiment is a method for optimizing demulsifier injection rate in a GOSP. The method includes reading a demulsifier dosage rate for a crude inlet to the plant, reading a wet crude flow rate for the crude inlet to the plant, reading a first primary demulsifier injection rate for the crude inlet to the plant, reading a current value of basic sediment and water (BS&W) at either a desalter outlet or an export crude outlet of the plant, determining the current value of basic sediment and water (BS&W) is not within a predetermined range, determining a second primary demulsifier injection rate based on the first primary demulsifier injection rate, the demulsifier dosage rate, and the wet crude flow rate, and causing to modify a demulsifier injection pump stroke to inject the demulsifier at the second primary demulsifier injection rate. The method may also include reading the demulsifier dosage rate for a crude type from a degassing tank, reading the wet crude flow rate for a crude outlet from the degassing tank, reading a first secondary demulsifier injection rate for the degassing tank, reading a current value of basic sediment and water (BS&W) at either a desalter outlet or an export crude outlet of the plant, determining the current value of basic sediment and water (BS&W) is not within a predetermined range, determining a second secondary demulsifier injection rate based on the first secondary demulsifier injection rate, the demulsifier dosage rate, and the wet crude flow rate, and causing to modify a secondary demulsifier injection pump stroke to inject the secondary demulsifier at the second secondary demulsifier injection rate. The method may also include determining the current value of basic sediment and water (BS&W) is within a predetermined range, and causing to stop injection of secondary demulsifier.

Another example embodiment is a system for optimizing wash water rate in a GOSP. The system includes a programmable logic controller operatively coupled to a control unit associated with the plant, and a non-transitory computer-readable medium in communication with the programmable logic controller and having stored thereon a set of instructions that when executed cause the programmable logic controller to perform operations including reading a wash water percentage rate for a crude inlet to the plant, reading a crude flow rate from a desalter outlet of the plant, reading a first wash water rate for the crude inlet to the plant, reading a current value of salt content at either the desalter outlet or an export crude outlet of the plant, determining the current value of the salt content is not within a predetermined range, determining a second wash water rate based on the first wash water rate, the wash water percentage rate, and the crude flow rate, and causing to modify a wash water valve opening to inject the wash water at the second wash water rate.

BRIEF DESCRIPTION OF THE DRAWINGS

So that the manner in which the features, advantages and objects of the invention, as well as others which may become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only example embodiments of the invention and is therefore not to be considered limiting of its scope as the invention may admit to other equally effective embodiments.

DETAILED DESCRIPTION

Figure 1A:
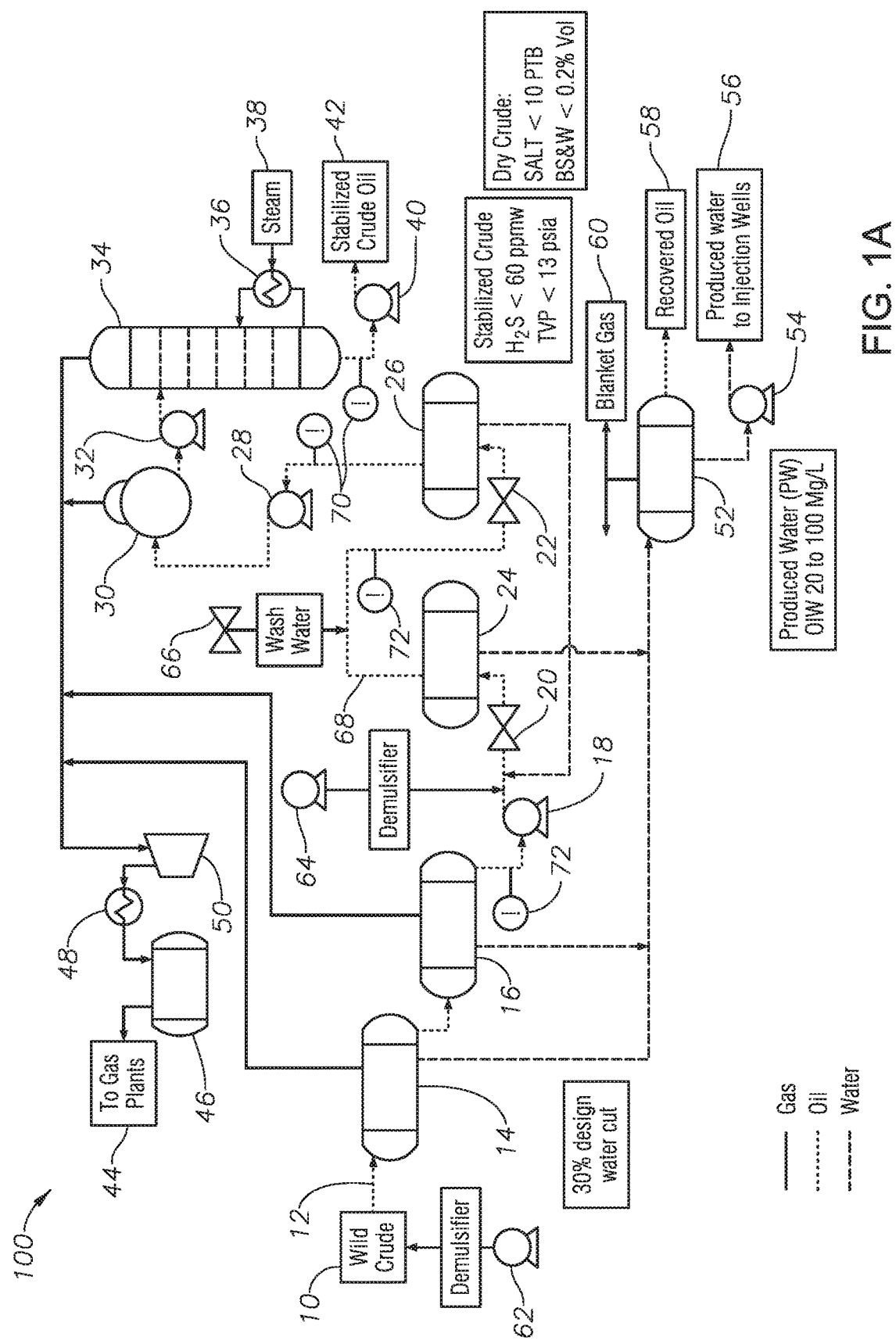
FIG. 1A is a schematic showing common features for optimizing demulsifier and wash water injection rate in a GOSP, according to one or more example embodiments of the disclosure.

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

FIG. 1 is a schematic showing common features for optimizing demulsifier and wash water injection rate in a GOSP 100, according to one or more example embodiments of the disclosure. GOSP 100 receives wild/wet crude 10 from upstream field via a trunk line 12 that feeds the crude into a three-phase separation vessel, a High Pressure Production Trap (HPPT) 14, where the first stage of gas and free water separation from the crude takes place. The separated wet crude from the HPPT 14 is fed into a second stage three-phase separation vessel, a Low Pressure Production Trap (LPPT) 16 for further separation of more gas and water from the crude at a lower pressure. In some example GOSP configurations, the wet crude from the LPPT may also be channeled through a wet/dry heat exchangers into a three-phase Low Pressure Degassing Tanks (LPDT) or separator that normally operates at almost atmospheric pressure (circa 3 psig) for more gas and water to be removed from the wet crude 10. It should be noted, however, that the two additional unit operations, for example, wet/dry heat exchanger and LPDT are not shown in the GOSP illustrated in FIG. 1.

The wet crude oil from the LPPT 16 or LPDT is transferred by crude charge pumps 18 into Wet Crude Handling Facilities (WCHF) via mixing valves 20, 22. The WCHF may include a Wet Crude Handling (WCH) dehydrator 24 and a single/double stage WCH desalter 26. Crude 10 must be treated in the WCHF to meet first the Basic Sediment & Water (BS&W) specification of 0.2 v/v % and then the salt content of less than 10 PTB (pounds per thousand barrels). The dehydrated/desalted crude is then pumped into an atmospheric spheroid or degassing tank 30 via shipper pump 28 and then flows to a crude stabilizer column 34 via booster pump 32, where it is stripped of volatile components and stabilized to export grade crude specification of 13 TVP (True Vapor Pressure) at 130° F. and its $H_2S$ content removed to a required specification of 10 ppm wt. $H_2S$. Optionally, steam 38 may be injected into the crude after emerging from the reboiler 36 and before entering into the crude stabilizer. The produced export grade crude or stabilized oil 42 is finally pumped by shipper pumps 40 to its export terminal or refinery destination. The gas streams from the production traps 14, 16, degassing tank 30, and the stabilizer 34 flow to the gas gathering compression system for onward delivery to the gas processing plants 44. Each stage of the compression plant consist of a gas compressor 50, a compressor discharge cooler 48 and a compressor discharge gas knock-out vessel 46 The water stream from the productions traps 14, 16, and the WCH dehydrator 24 is pumped to a Water Oil Separator (WOSEP) 52 where the WOSEP separates water 56 from recovered oil 58. Blanket gas 60 is used to maintain normal operating pressure in the WOSEP. The WOSEP removes the oil content of inlet produced water to less than 100 ppm at the outlet as the disposal water, which is injected, via an injection pump 54, back into the reservoir for water-flooding and pressure maintenance.

As shown in FIG. 1, there are two points 62, 64 for demulsifier injection in a GOSP 100. The first injection point 62 is upstream of the high pressure production trap 14 at the inlet 12 of the plant which is referred to as the primary demulsifier injection. The second injection point 64 is at upstream of the Wet Crude Handling Facilities 24, 26, which is referred to as secondary/emergency demulsifier injection. The wash water 66 is injected into the dehydrated crude 68 entering the desalter 26 to meet the salt content specification of the produced crude.

The system illustrated in FIG. 1 may be equipped with one or more sensors 70, 72 to measure the BS&W content as well as the salt content in the oil stream at appropriate locations of GOSP 100. For example, the system may include one or more sensors, such as BS&W analyzers 70 for measuring a current value of BS&W at the dehydrator outlet or desalter outlet or at export crude outlet of the plant 100. Similarly the system may include one or more sensors, such as salt content analyzers 72 for measuring a salt content in the oil stream after the oil exits the desalter outlet or at export crude outlet of the plant 100.

Figure 1B:
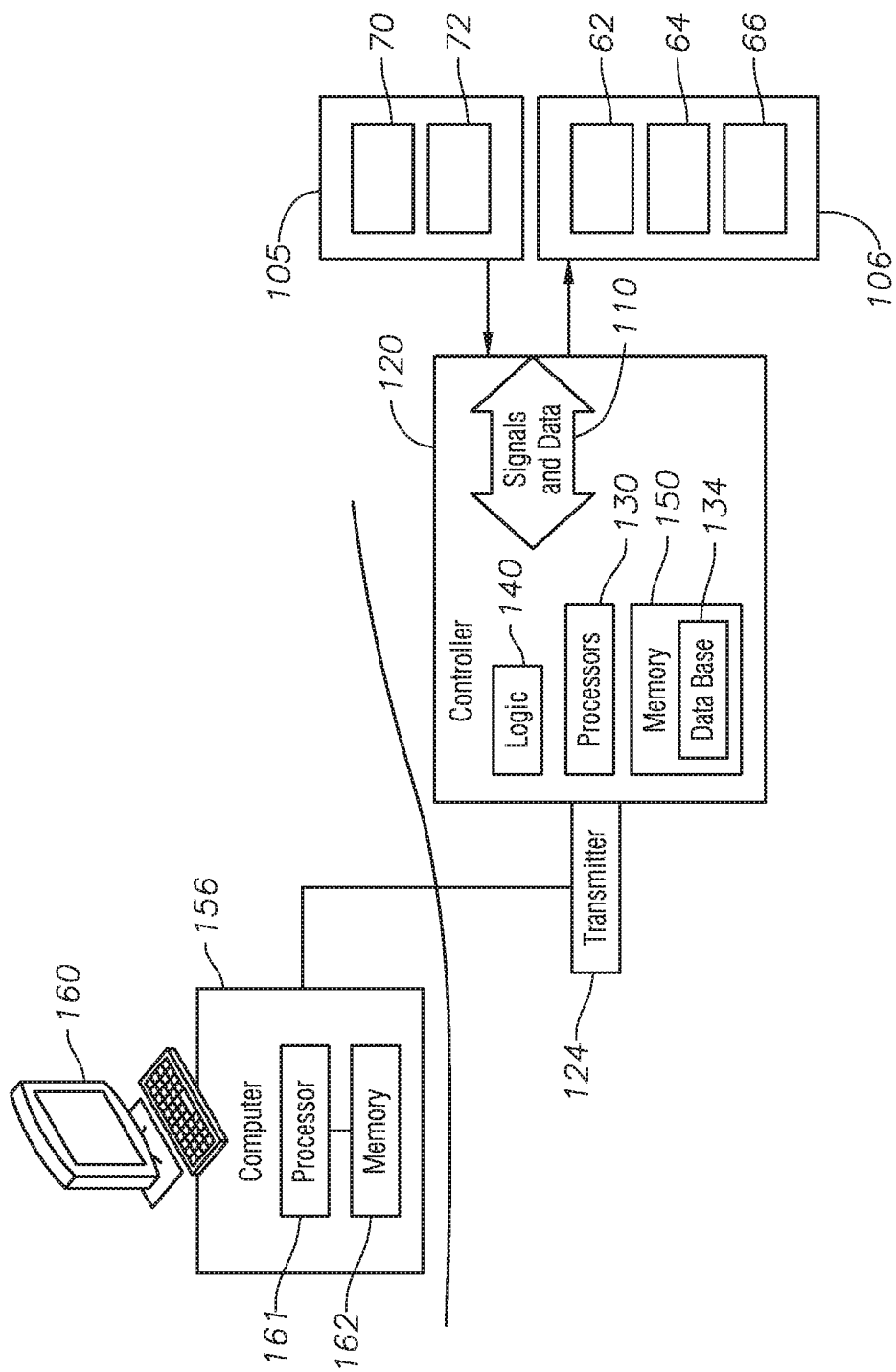
FIG. 1B is an extension of the system illustrated in FIG. 1A.

FIG. 1B is an extension of the system illustrated in FIG. 1A in accordance with one or more example embodiments. The system can include one or more sensors 105, one or more actuators 106, and one or more controllers 120. Controller 120 can be operatively coupled to the sensors 105 and actuators 106 for controlling operation of the actuators 106 as well as retrieving or reading data from the sensors 105. The data can include sensor data for example from BS&W analyzers 70 reading a current value of BS&W at the dehydrator outlet or desalter outlet and an export crude outlet of the plant 100. Similarly the sensor data may include data from salt content analyzers 72 reading a salt content in the oil stream after the oil exits the desalter outlet or at export crude outlet of the plant 100.

The PLC 120 can comprise a programmable drive and/or sampling control system. The controller can include logic 140 for acquiring sensor data and/or signals 110 from the sensors 105 and sending signals 110 to actuators 106. Memory 150, located inside or outside the controller 120, can be used to store acquired data, and/or processing results (e.g., in a database 134). The memory 150 is communicatively coupled to the processor(s) 130. While not shown in FIG. 1B, it should be noted that the memory 150 may be located in or outside of GOSP 100. A data transmitter 124 may be used to transmit data and/or signals to the outside the GOSP for display by the quality control system, for example. Thus, the system may include the data transmitter 124 (e.g., a telemetry transmitter) to transmit the data to a surface data processing computer 156.

The system can further include a computer 156 coupled to and configured to communicate with, control, and/or display data received from the controller 120. The computer 156 can include a processor 161 and memory 162 for controlling the system. A monitor 160 can be coupled to the computer for displaying data that can include sensor data, transformed (e.g., filtered) sensor data, and/or feedback control data. The programmable logic controller (PLC) 120 may form a part of the Distributed Control System (DCS) within the GOSP 100. The PLC 120 may be operatively coupled to a set of sensors 105 from which data may be acquired, and a set of actuators 106 which may be controlled by the PLC 120 based on the control strategy and algorithm stored in memory 150. Different control strategies and algorithms may be established for optimizing each of the wash water, primary, and emergency demulsifier injection rates as discussed in the following paragraphs.

Control Strategy for Primary Demulsifier Injection

The objective of primary demulsifier injection 62 is to provide adequate amount of demulsifier chemical to the wet crude 10 stream at inlet 12 of the plant 100 that will be enough to achieve the required dehydrated/desalted crude specifications under normal operating conditions.

Optimum Operating Condition

The mechanism of demulsification of oil-water emulsion and separating water from oil involves combination of electrical, thermal, chemical and mechanical methods. In a particular GOSP, the extent to which one method dominates over the other depends on various factors and operating conditions. Operation experience through field trials is usually adopted to optimize and establish the best combination of the methods. Therefore, the first step in the control strategy for automation of primary demulsifier injection is to individually control all necessary process variables to their optimum value and adjust demulsifier injection rate whenever there is a deviation in the crude specification after optimizing all other parameters. The objective is to identify the optimum operating condition that will minimize use of the demulsifier chemical to the lowest level possible. A number of variables that impact the dehydration/desalting process and a proposed enhancement for optimizing them is discussed in the following paragraphs.

Types of Crude & Demulsifier

Different types of crude require different amounts of a particular type of demulsifier for efficient crude dehydration/desalting. Also, the effectiveness of different types of demulsifiers on a particular crude type varies. This is defined by their performance factor, which is a number assigned to each chemical to indicate their effectiveness. Performance factor is calculated as a ratio of the required treatment dosage of a chemical, which can be determined during plant trials, to the treatment dosage of the chemical exhibiting the lowest effective treatment dosage. Demulsifier performance is routinely characterized using simple test procedures developed for use in the field. Because of the complexity of factors involved in determining emulsion stability and the effectiveness of a given demulsifier chemical and the wide variety of fundamental, mechanistic approaches of demulsifier selection often give way to empirical methods. Field trials including bottle tests are normally performed in the plant to make the selection of the most cost effective chemical additive blend and establish demulsifier injection dosage in Part Per Million (PPM). It is good practice to repeat the field trial/bottle test every two years at every GOSP, and chemical additive vendors generally provide assistance for such studies whenever necessary. Table 1 below, for example, presents a typical demulsifier dosage in Part Per Million (PPM) for different types of Arabian Crudes.

TABLE 1

Types of Crude and Demulsifier Dosages

| Crude Type | API Gravity | Demulsifier Dosage (PPM vol.) |
|---|---|---|
| ASL—Arab Super Light | 49-52° API | 3 |
| AXL—Arab Extra Light | 36-41° API | 5 |
| AL—Arab Light | 32-34° API | 8 |
| AM—Arab Medium | 29-32° API | 12 |
| AH—Arab Heavy | 26-29° API | 15 |

Crude Production Rate

Once the demulsifier dosage in part per million (PPM) required for a particular crude using a particular type of demulsifier and at normal operating condition in a particular GOSP is established through field trial and/or bottle tests, the rate of demulsifier injection will depend on the wet crude production flow rate which can be represented as follows:

$$Qd=([PPM]*Qwc)/16666.67$$

Where:
Qd=flow rate of demulsifier in USGPH
Qwc=flow rate of wet crude (oil+water) in USGPM
[PPM]=demulsifier dosage in part per million volume PPM (vol.)

Figure 2:
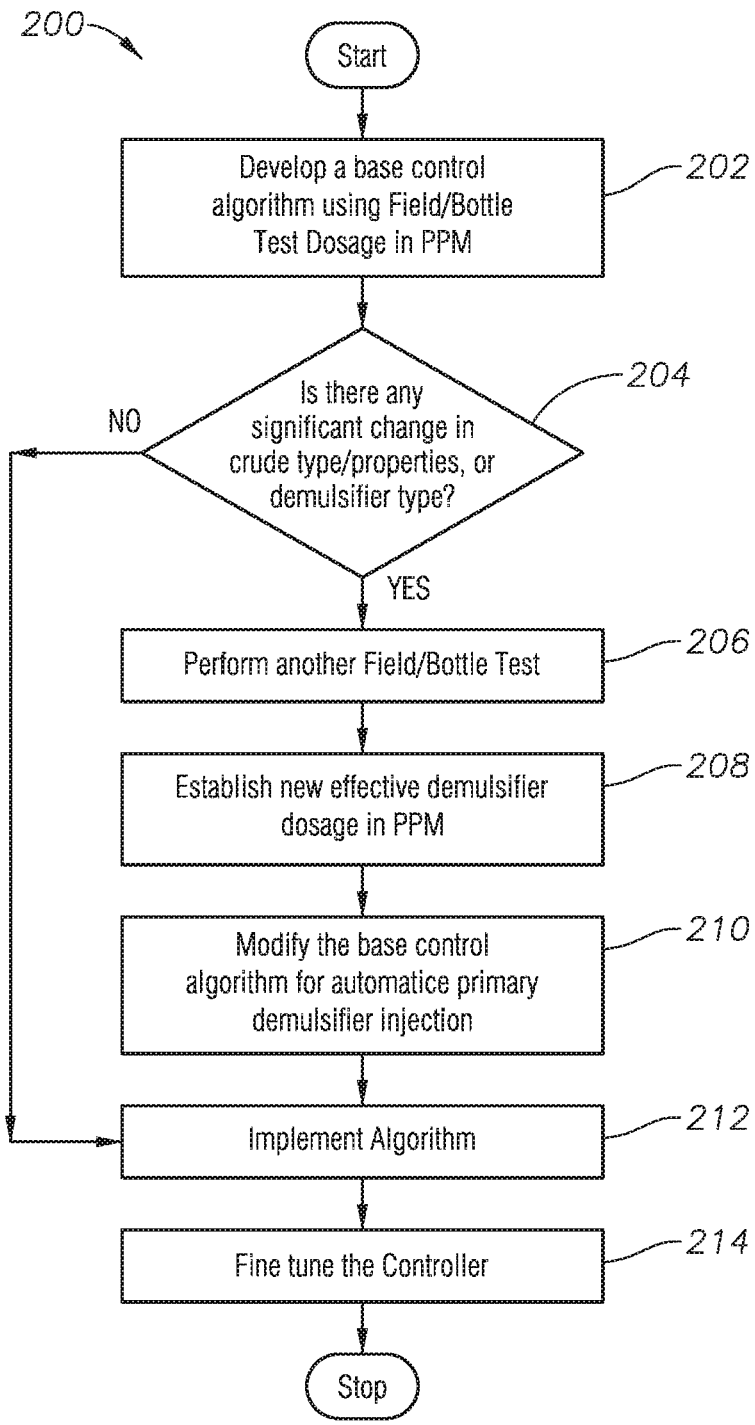
FIG. 2 is a flow diagram illustrating example steps in a method for optimizing demulsifier injection rate in a GOSP, according to one or more example embodiments of the disclosure.

FIG. 2 is a flow diagram illustrating example steps in a method 200 for optimizing demulsifier injection rate in a GOSP, according to one or more example embodiments of the disclosure. The method involves developing a base control algorithm using field or bottle test dosage in PPM at step 202. The method then involves determining, at step 204, if there is any significant change in crude type or properties of crude or demulsifier type. If there is any significant change in crude type or properties of crude or demulsifier type, the system performs another field or bottle test at step 206, and established a new effective demulsifier dosage in PPM at step 208. At step 210, the system modifies the base control algorithm for automatic primary demulsifier injection. However, if there is no significant change in crude type or properties of crude or demulsifier type, the system implements the original algorithm at step 212. At step 214, the system may fine tune the controller to optimize demulsifier injection rate in the GOSP.

Crude/Demulsifier Mixing

The extent of mixing between the wet crude stream and demulsifier chemical will also have significant impact on the performance of the wet crude handling system. Currently, use of the injection quill is the most popular means of chemical dosing. For more effective mixing and optimization of chemical usage use of a modern mixing device could be adopted.

Transformer Voltage/Current Reading

DCS indication and alarms of all voltage and current readings of all dehydrators and desalters at GOSPs may be provided for continuous monitoring to ensure that the electrolytic operation is at optimum performance as designed.

Crude Temperature to Dehydrators/Desalters

The demulsifier dosage in Part Per Million (PPM) required for a particular crude, using a particular type of demulsifier, may vary with the crude temperatures. For most GOSPs there are crude heating systems upstream of the Wet Crude Handling Facilities 24, 26 that maintain constant crude temperature to the system. Therefore, the effect of temperature on the demulsifier dosage can be neglected in the automation scheme. The optimum operating temperature should be determined by field operation and maintained at that level.

Pressure/Vaporization in Dehydrators/Desalters

Vapor switches are usually provided in all dehydrators and desalters to ensure no vaporization occurs in the dehydration/desalting units as that will greatly affect the efficiency of the electrolytic system. The switches should be checked regularly to ensure they are functioning properly and the optimum set point should be maintained at all times.

Performance Indicator Criteria

For effective control strategy to be established for the primary demulsifier injection 62, a means of indicating the efficiency and performance of the crude dehydration/desalting process needs to be identified and selected. The input of the performance indicator value may be used to adjust the demulsifier injection rate whenever there is a short fall in performance. The crude BS&W (% Vol.) is identified as most appropriate key performance indicator (KPI) to measure effectiveness of dehydration/desalting unit since it represents the final product target objective of the dehydration process. With modern technology, online BS&W analyzer installed at crude outlet from last stage desalter can provide continuous measurement of volume percent of basic sediment and water (BS&W) in oil from crude handling unit. This may serve as key performance indicator for monitoring the process performance as well as the demulsifier injection rate. BS&W is one of the key product specifications of the crude from dehydration process and may serve as a good control input parameter for varying the rate of demulsifier injection.

Rules-Based Programmable Logic Control for Primary Demulsifier Injection

There is no direct formula relating the produced crude BS&W specification as a performance indicator with other parameters to the demulsifier injection rates. Most available formulae are at microscopic level. Macroscopic formulae are required so that parameters in the formulae can be measured by field instruments and process in the DCS logic to output control responses. Therefore the control strategy to be adopted for the primary demulsifier injection rate in the present invention may be a rules-based programmable logic control. The strategy may involve adjusting the demulsifier injection rates with the aim of maintaining the key performance indicator (BS&W) at normal set point whenever there is/are any unexpected change(s) in any other factors or operation parameters that could affect the set point.

Figure 3:
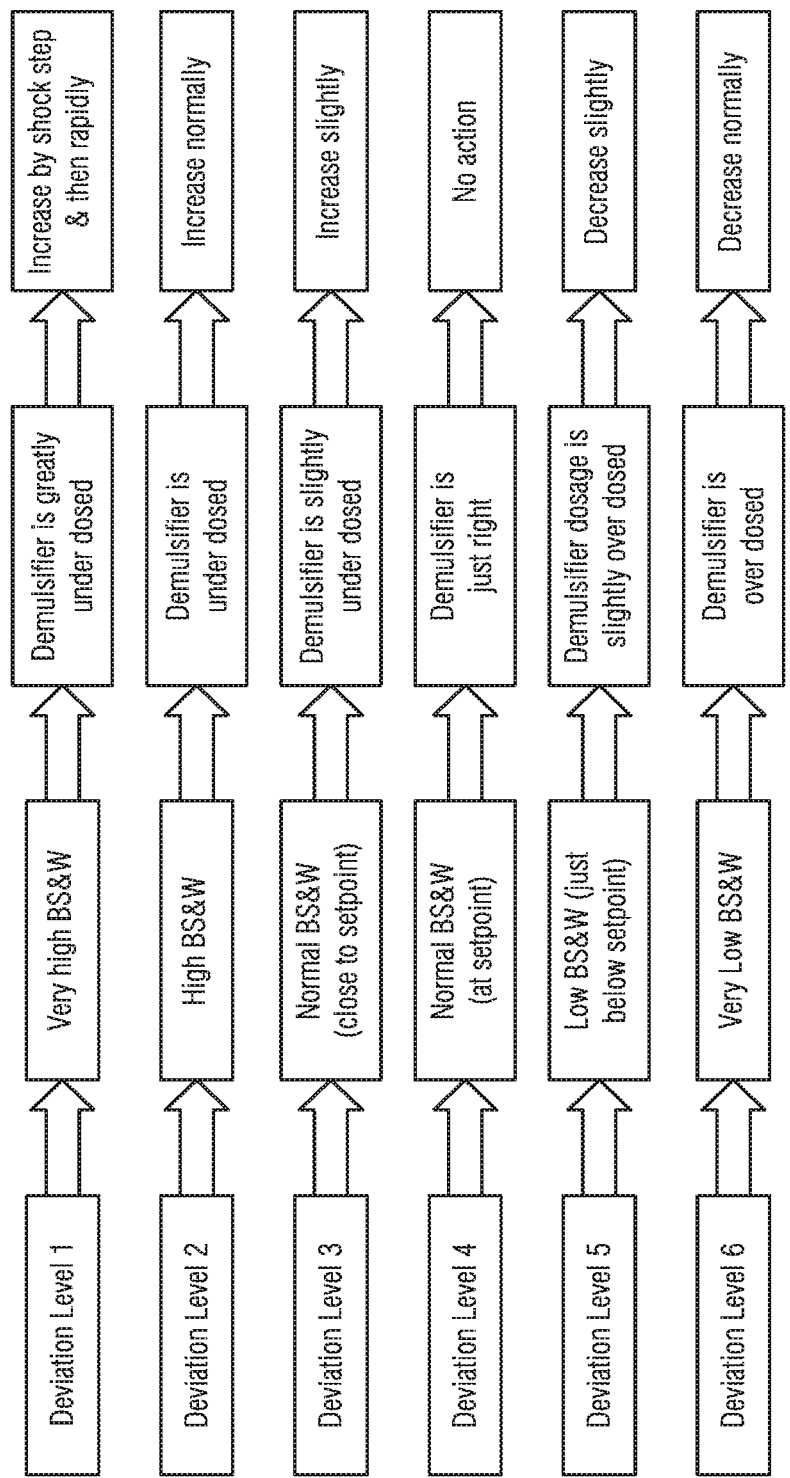
FIG. 3 is a flow diagram illustrating example steps in a method for optimizing demulsifier injection rate in a GOSP, according to one or more example embodiments of the disclosure.

As illustrated in FIG. 3, six (6) levels of deviation in set point of the KPI (% BS&W) may be used with corresponding action to adjust the demulsifier injection rates in a rule-based control strategy. FIG. 3 is a flow diagram illustrating example steps in a method for optimizing demulsifier injection rate in a GOSP, according to one or more example embodiments of the disclosure. The purpose of the demulsifier injection rate adjustment is to achieve crude BS&W specification of 0.2 vol % at all times with a specified tolerance.

Table 2 below presents ranges of BS&W deviations from normal set point of 0.2 vol. % with corresponding percentage increase or decrease in primary demulsifier injection rates. Table 2 is a tabular illustration of steps shown in FIG. 3, for example. In case of a GOSP with multiple primary demulsifier injection points, any deviation in the crude BS&W may accordingly initiate increase or decrease in all primary demulsifier injection rates at equal proportions as in Table 2. The BS&W readings may be within tolerance of one decimal place and may be rounded up/down, for example.

TABLE 2

Deviation in BS&W and Corresponding Primary Injection Rate Increment

| Deviation Level | BS&W Deviation Range (% vol.) | Require action to change primary demulsifier injection rate |
|---|---|---|
| Level 1 | BS&W > 0.5 (very high BS&W => demulsifier is greatly under dosed) | Increase ALL primary demulsifier injection rates by a shock step increment (50%) and then increase rapidly by 25% step increment until BS&W is ≤0.5. |
| Level 2 | 0.3 ≤ BS&W ≤ 0.5 (high BS&W => demulsifier is under dosed) | Increase ALL primary demulsifier injection rates normally by 15% step increment of the established dosage until BS&W is <0.3. |
| Level 3 | 0.2 < BS&W < 0.3 (normal BS&W, close to set point => demulsifier is slightly under dosed) | Increase ALL primary demulsifier injection rates slightly by 10% step increment of the established dosage until BS&W is = 0.2. |
| Level 4 | BS&W = 0.2 (normal BS&W, at set point => demulsifier is just right) | Keep ALL current primary demulsifier injection rates. This is the optimum primary demulsifier injection rate. |
| Level 5 | 0.1 ≤ BS&W < 0.2 (low BS&W, below set point => demulsifier is slightly overdosed) | Reduce ALL primary demulsifier injection rates slightly by 10% step decrement of the established dosage until BS&W is = 0.2. |
| Level 6 | BS&W < 0.1 (very low BS&W => demulsifier is over dosed) | Reduce ALL primary demulsifier injection rates normally by 25% step decrement of the established dosage until BS&W is ≥0.1. |

For example, using the typical demulsifier dosage presented in Table 1, a control algorithm can be developed for the individual primary demulsifier injection points in a GOSP based on the equation earlier established for the injection flow rate as follows:

$$Qd = ([PPM] * Qwc)/16666.67$$

Table 3 below summarizes the control algorithm equation for each crude type using typical demulsifier dosage as an example.

TABLE 3

Control Algorithm Equations for Primary Demulsifier Injection

| Crude Type | Base Dosage* | Base Algorithm Equation |
|---|---|---|
| ASL—Arab Super Light | 3 PPM | $Q_d = (1.8 \times 10^{-4})Q_{wc}$ |
| AXL—Arab Extra Light | 5 PPM | $Q_d = (3.0 \times 10^{-4})Q_{wc}$ |
| AL—Arab Light | 8 PPM | $Q_d = (4.8 \times 10^{-4})Q_{wc}$ |
| AM—Arab Medium | 12 PPM | $Q_d = (7.2 \times 10^{-4})Q_{wc}$ |
| AH—Arab Heavy | 15 PPM | $Q_d = (9.0 \times 10^{-4})Q_{wc}$ |

An algorithm for data reading, calculation of primary demulsifier injection rate, and output to adjust the injection pump rates based on the aforementioned ruled-based control strategy is presented in FIG. 5, which will be described in later paragraphs of this section.

The overall steps in the primary demulsifier injection control strategy as described in the foregoing subheadings are as represented in the example flow chart in FIG. 3, for example.

Control Strategy for Wash Water Rate

Wash water is used to increase the water droplet concentration, which enhances rupturing of the protective coating surrounding the brine and promote coalescence to form larger, more easily separated droplets to meet the crude salt content specification. Both the rate and quality of wash water are important in crude dehydration/desalting process. Optimum wash water rate should be determine for a specific GOSP from field trial while keeping all other operating parameter at optimum values and meeting crude specifications within minimum tolerance. Automatic control of the wash water flow rate as the crude salt content changes will provide optimum desalter performance and wash water usage. The control strategy to be adopted can be similar to that of primary demulsifier injection using the Crude Salt Content in PTB as the performance indicator instead of BS&W used in the primary demulsifier injection. The control strategy that may be implemented in the present invention is described in the following paragraphs.

Ruled-Based Control Strategy for Wash Water Rate

Figure 4:
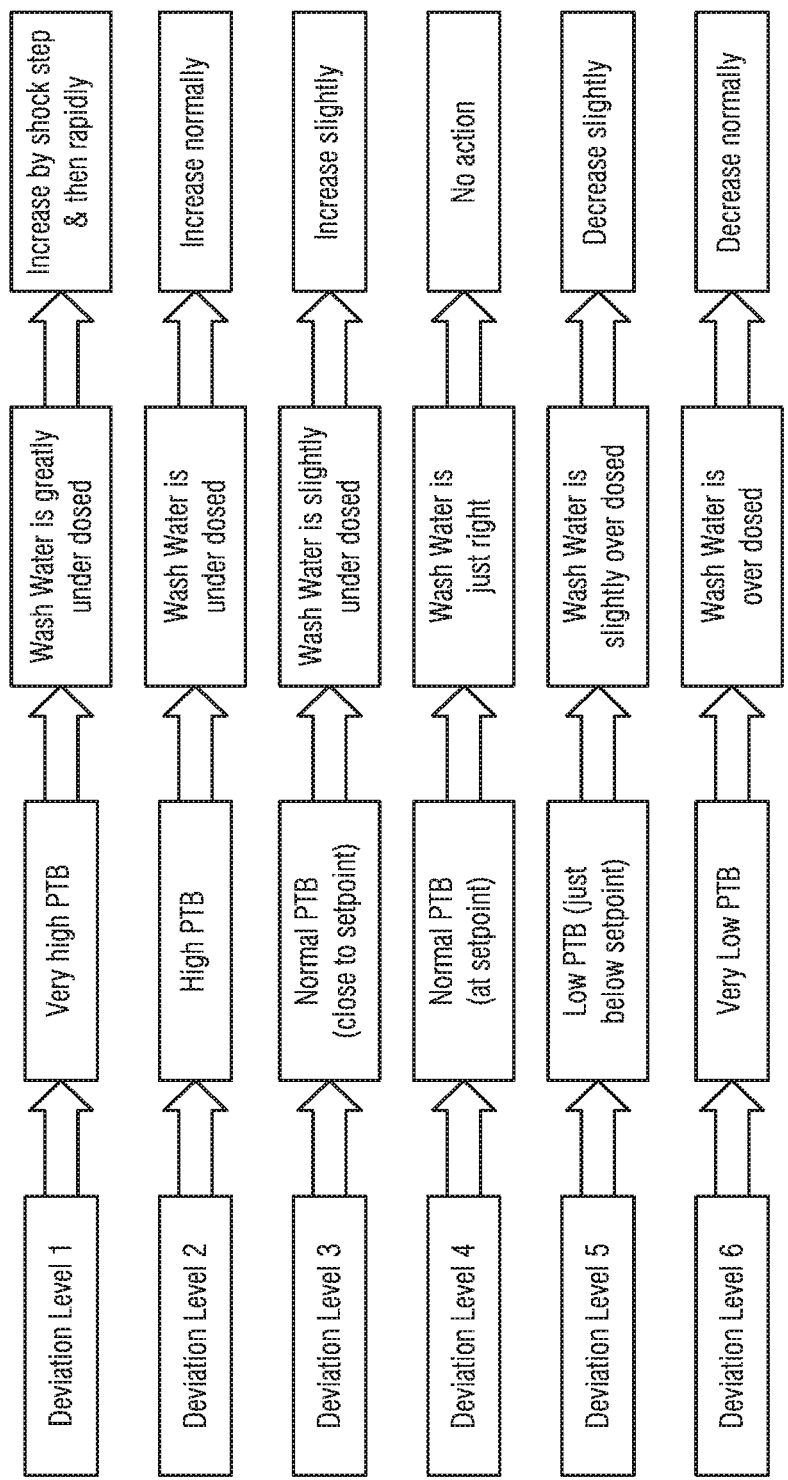
FIG. 4 is a flow diagram illustrating example steps in a method for optimizing wash water injection rate in a GOSP, according to one or more example embodiments of the disclosure.

The strategy may involve adjusting the wash injection rates with the aim of maintaining the key performance indicator (PTB) at normal set point whenever there is/are any unexpected change(s) in any other factors or operation parameters that could affect the set point. As illustrated in FIG. 4, six (6) levels of deviation in set point of the KPI (PTB) may be used with corresponding action to adjust the wash-water injection rates in a rule-based control strategy. The control strategy illustrated in FIG. 4 is just one example. The purpose of the wash water injection rate adjustment is to achieve crude salt content (PTB) specification of 10 at all times with a specified tolerance.

Table 4 presents typical ranges of PTB deviations from normal set point of 10 PTB with corresponding percentage increase or decrease in wash water rates. The PTB readings may be within tolerance of one percent, for example. Table 4 is a tabular illustration of steps shown in FIG. 4, for example.

TABLE 4

Deviation in PTB and Corresponding Wash Water Rate Increment

| Deviation Level | PTB Deviation Range | Require action to change primary demulsifier injection rate |
| --- | --- | --- |
| Level 1 | PTB > 20 (very high PTB => wash water is greatly under dosed) | Increase wash water rates by a shock step increment (50%) and then increase rapidly by 25% step increment until PTB is ≤20. |
| Level 2 | 15 ≤ PTB ≤ 20 (high PTB => wash water is under dosed) | Increase wash water rates rates normally by 15% step increment of the established optimum rate until PTB is <15. |
| Level 3 | 10 < PTB < 15 (normal PTB, close to set point => wash water is slightly under dosed) | Increase wash water rates rates slightly by 10% step increment of the established optimum rate until PTB is = 10. |
| Level 4 | PTB = 10 (normal PTB => wash water is just right) | Keep wash water rates. This is the optimum wash water rate. |
| Level 5 | 5 ≤ PTB < 10 (Low PTB, just below set point => wash water is slightly overdosed) | Reduce wash water rates slightly by 10% step decrement of the established optimum rate until PTB is = 10. |
| Level 6 | PTB < 5 (very low PTB => wash water is overdosed) | Reduce wash rates normally by 25% step decrement of the established optimum rate until PTB ≥ 5. |

An algorithm for data reading, calculation of wash water rate and output to adjust the wash water pump rates based on the aforementioned ruled-based control strategy is similar to the algorithm presented in FIG. 5 for the primary demulsifier injection except that the KPI parameter of PTB replaces BS&W as in Table 4 above and the control equation is replaced with the equation derived as follows:

In the algorithm, the rate of wash water required for a desalter crude throughput is given by:

$$Qww=(Pww*Qc)/100$$

Where:
$Qww$=flow rate of wash water in USGPM
$Qc$=flow rate of crude in USGPM (from desalter)
$Pww$=percentage of wash water in % vol.

The control algorithm for wash water rate control is presented in FIG. 6, which will be described in later paragraphs of this section.

It should be noted, however, that the percentage of wash water for optimum performance is to be determined and optimized by field trials. For example, 5 vol % of the crude throughput is common for optimum performance. Using this value as an example, the equation can be given as follows:

$$Qww=(5*Qc)/100=0.05*Qc$$

Wash Water and Oil Mixing

The wash water is normally injected just upstream of a mixing valve to provide effective mixing of wash water with the crude. The degree of wash water/oil mixing is crucial to the effectiveness of desalting process. The mixing should be performed such that the wash water contacts all of the dispersed brine droplets in the oil. Mixing must be sufficient to produce the desired contacting between the wash water and brine, sand, and sediment particles in the oil, but not high enough to cause formation of a stable emulsion. Special mixing valves/devices specifically designed to produce the desired intimate mixing between the wash water and the oil may be used for this purpose.

Control of Secondary/Emergency Demulsifier Injection

Emergency demulsifier is injected at upstream of crude dehydration/desalting units. The purpose is to compensate for any shortfall in primary demulsifier injection due to a major change in operating condition leading to adjusting the primary demulsifier pumps to their full limit (maximum capacity) without achieving the crude BS&W specification. The purpose is to ensure that the crude BS&W specification of 0.2 vol % is always achieved. Therefore, the injection flow rate of emergency demulsifier shall be zero most of the time, except when there is short fall in the crude BS&W specification after the primary demulsifier pumps have reached their capacity limits. An algorithm for data reading, calculation of secondary demulsifier injection rate and output to adjust the emergency injection pump rates is presented in FIG. 7, which will be described in the later paragraphs of this section.

System Requirements

All logic configurations may be implemented in the Distributed Control System (DCS) of the GOSP. The demulsifier and wash water pumps may take action based on set conditions. Each condition may initiate an action by calculating and changing the PID flow controller (Cascade Mode) set point which will lead to increase or decrease of the pump stroke adjuster to meet the required flow rate. For cases where there are two pumps (one in service and other on standby), the controller output may be configured such that the action to control the pump stroke adjuster is directed to the main dosing pumps at first instance and in case one of the two pumps is unavailable, it may be directed to the standby pump. Alternatively, the system can be configured such that the console operator can switch from one pump to other. The data reading may be done at a specified sampling rate which may be fixed based on one or more of analysis cycle rates for BS&W and PTB analyzers, control loop scan time required between data reading and adjusting the demulsifier/wash water injection rate, and demulsifier/wash water circulation time required for injection at previous rate to properly circulate and reflect on the performance of the dehydrators and desalters.

In a modern GOSP facility all hardware devices such as crude and water flow meters, online analyzers, etc., may be required for the automation of demulsifier and wash water injection and they are normally in place except that sometimes manual stroke adjustable demulsifier injection and wash water pumps may be installed and may require replacement. These stroke adjustable pumps can only be controlled by manual pump stroke adjustment at the pumps using graduated-bottle gauging system to set injection rates. Therefore, these pumps may need to be replaced with Electronic Capacity Control (ECC) types which are remote controllable pumps, to allow the injection rates to be adjusted through the DCS.

Because the control strategy to be adopted for the system is a ruled-based programmable logic control, the strategy may involve adjusting the demulsifier injection rates with the aim of maintaining the key performance indicators (BS&W) at normal set point whenever there is/are any unexpected change(s) in any other factors or operation parameters that could affect the set point. The systems and methods provide accurate and efficient online analyzers for continuous reading of product specifications, for example BS&W and PTB, and input to the DCS, which may provide the main performance indicator data on which the control algorithm relies.

Figure 5A:
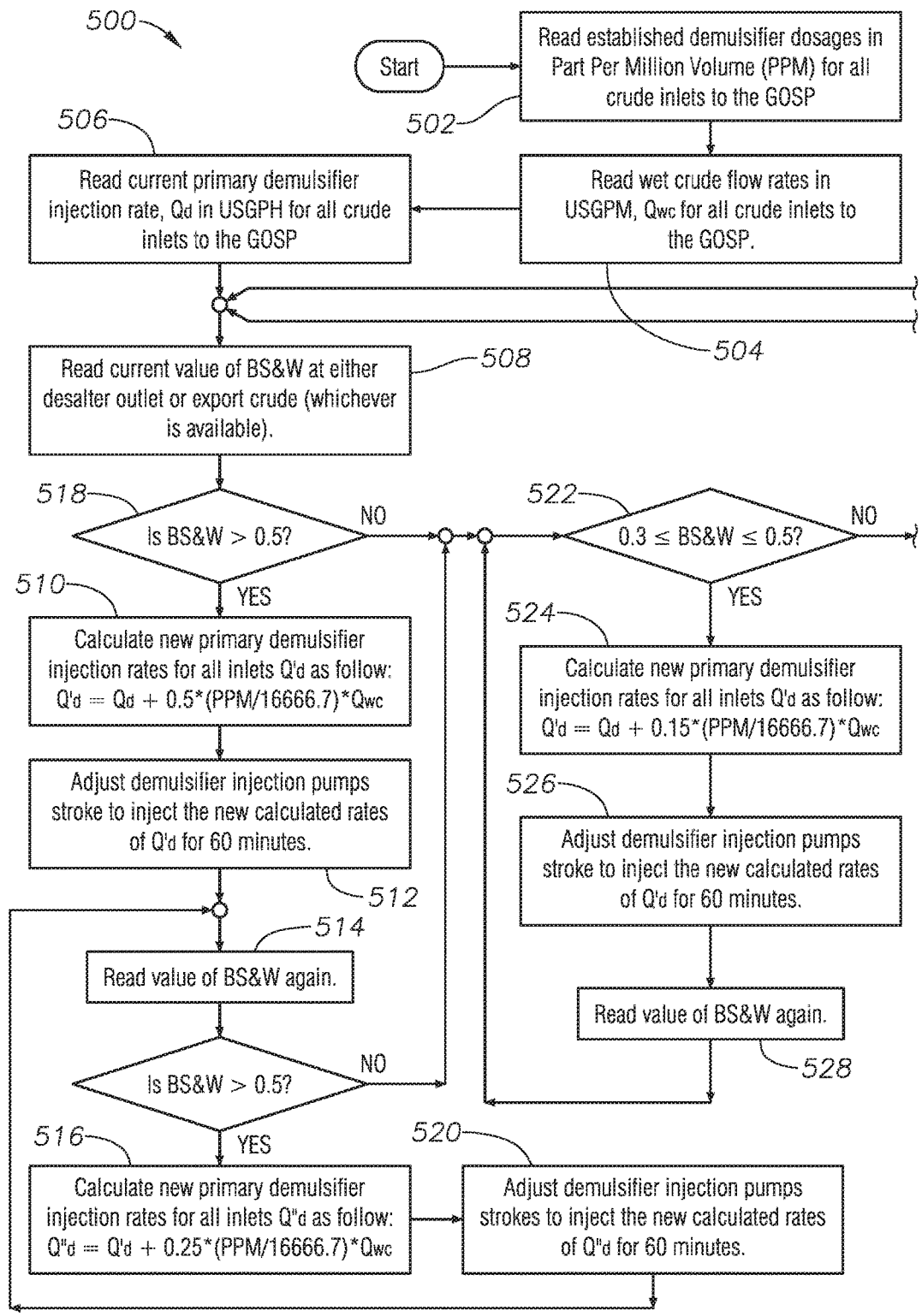
FIGS. 5A-C illustrate a flow diagram showing example steps in a method for optimizing primary demulsifier injection rate in a GOSP, according to one or more example embodiments of the disclosure.
Figure 5B:
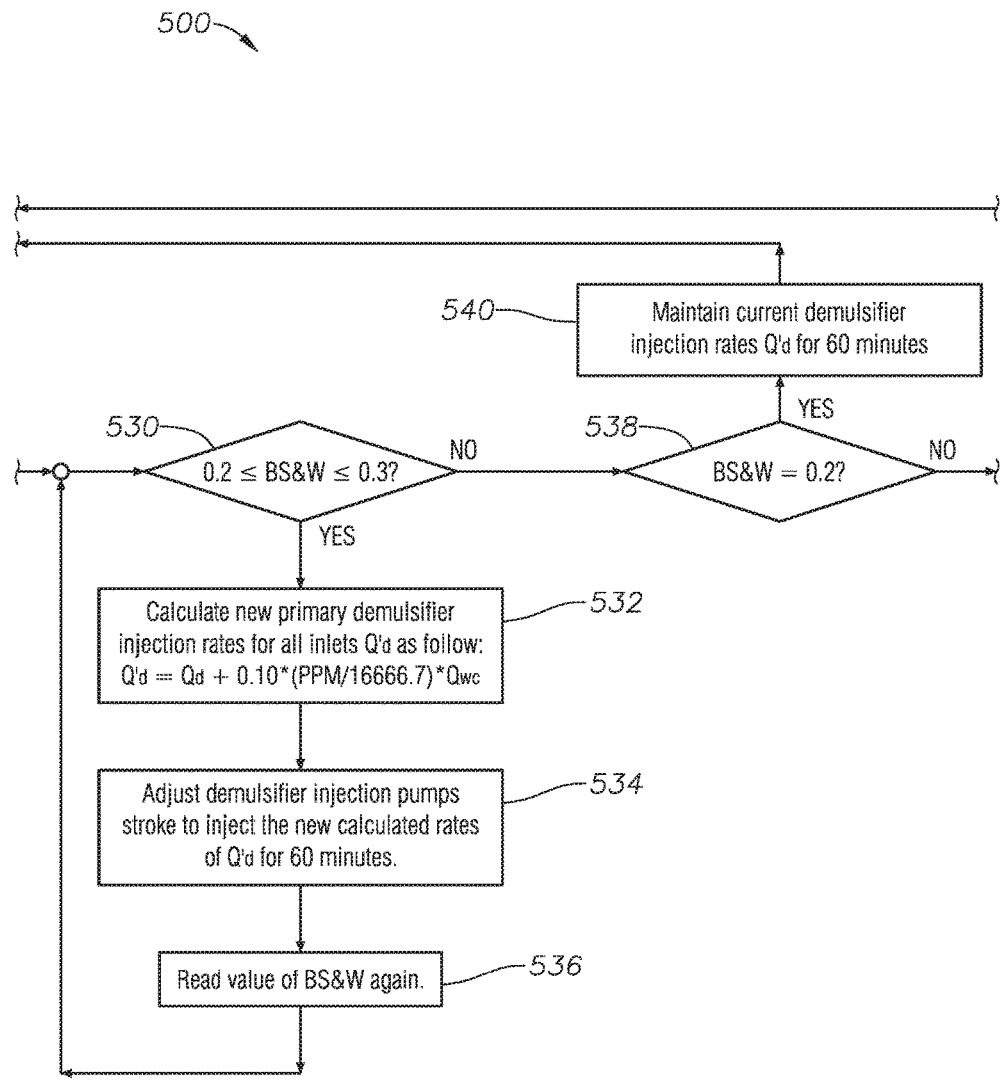
Figure 5C:
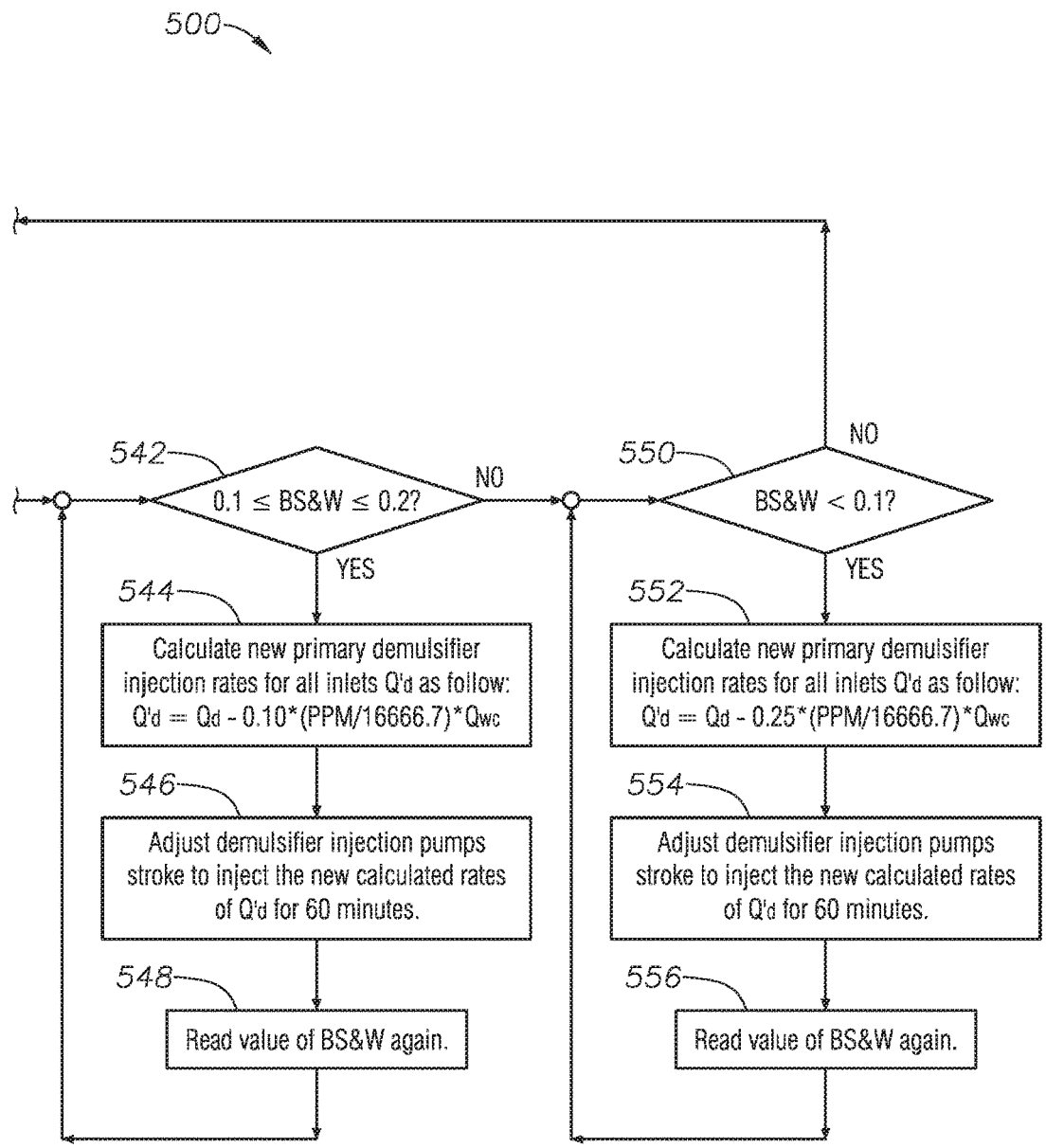

Turning now to FIGS. 5A-C, one example embodiment is a method 500 for optimizing demulsifier injection rate in a GOSP. The method includes reading a demulsifier dosage rate for a crude inlet to the plant at step 502, reading a wet crude flow rate for the crude inlet to the plant at step 504, reading a first primary demulsifier injection rate for the crude inlet to the plant at step 506, and reading a current value of basic sediment and water (BS&W) at either a desalter outlet or an export crude outlet of the plant at step 508. The method also includes determining, at steps 518, 522, 530, 538, 543, 550 if the current value of basic sediment and water (BS&W) is not within a predetermined range, for example greater than 0.5 as illustrated in step 518. If the value is not within the predetermined range, then the method includes determining a second primary demulsifier injection rate based on the first primary demulsifier injection rate, the demulsifier dosage rate, and the wet crude flow rate, at steps 524, 532, 544, 552 respectively. The method also includes causing to modify a demulsifier injection pump stroke to inject the demulsifier at the second primary demulsifier injection rate at steps 526, 534, 546, 554, and reading value of the BS&W again at steps 528, 536, 548, 556.

If the current value is at set point, then the system maintains the current demulsifier injection rate for a predetermined period of time at step 540. If at step 518 it is determined that the BS&W value is within the predetermined range, then the system determines a third primary demulsifier injection rate based on the first primary demulsifier injection rate, the demulsifier dosage rate, and the wet crude flow rate, at steps 510, causes to modify a demulsifier injection pump stroke to inject the demulsifier at the third primary demulsifier injection rate at steps 512, and reads value of the BS&W again at step 514. After performing this operation, the system checks again to see that the BS&W is within the predetermined range, if it is, then the system repeats steps 510, 521 with different values in steps 516, 520, and in case the current value is not within the predetermined range, then the process flow goes back to step 518 for execution.

Figure 6A:
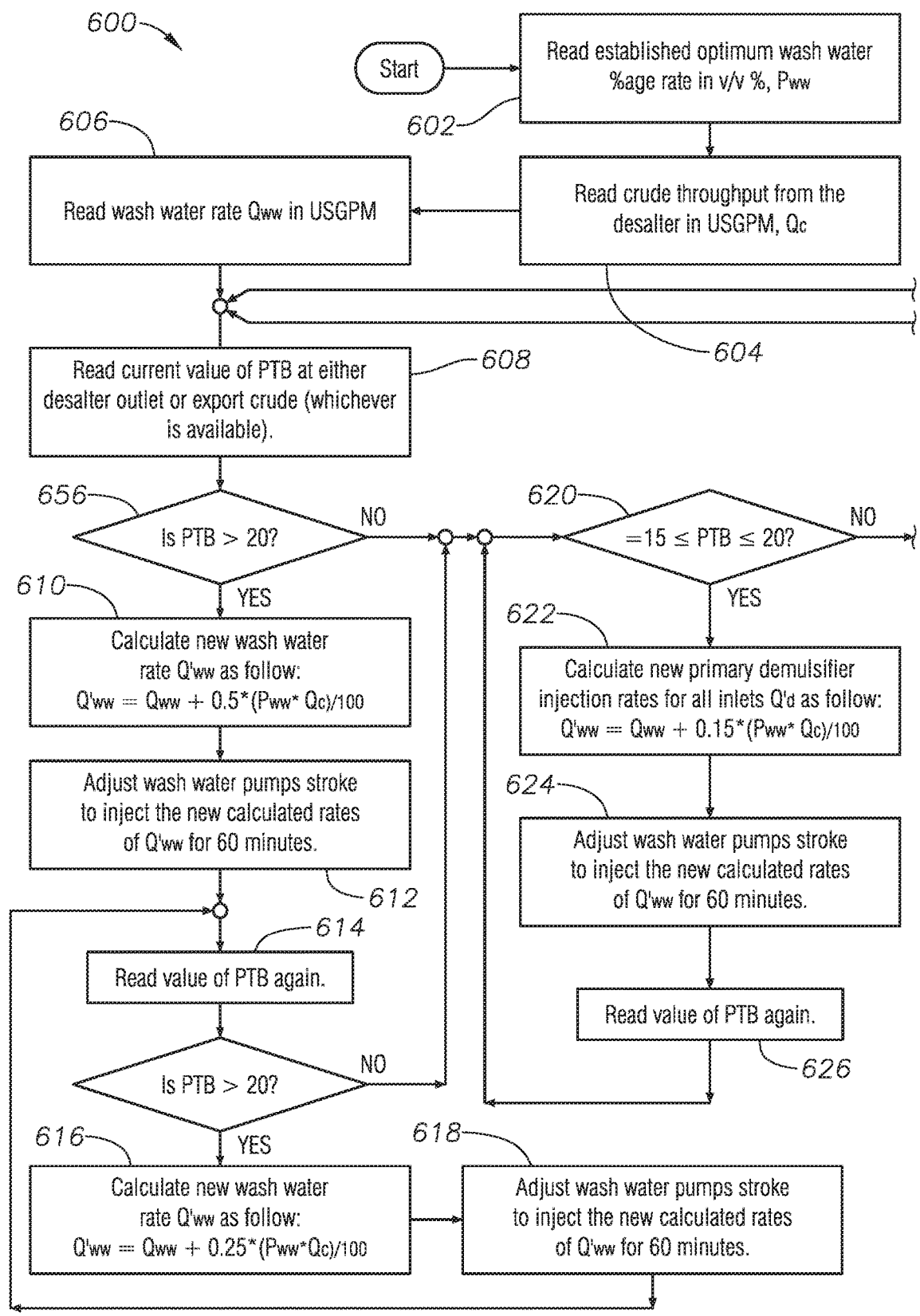
FIGS. 6A-C illustrate a flow diagram showing example steps in a method for optimizing wash water injection rate in a GOSP, according to one or more example embodiments of the disclosure.
Figure 6B:
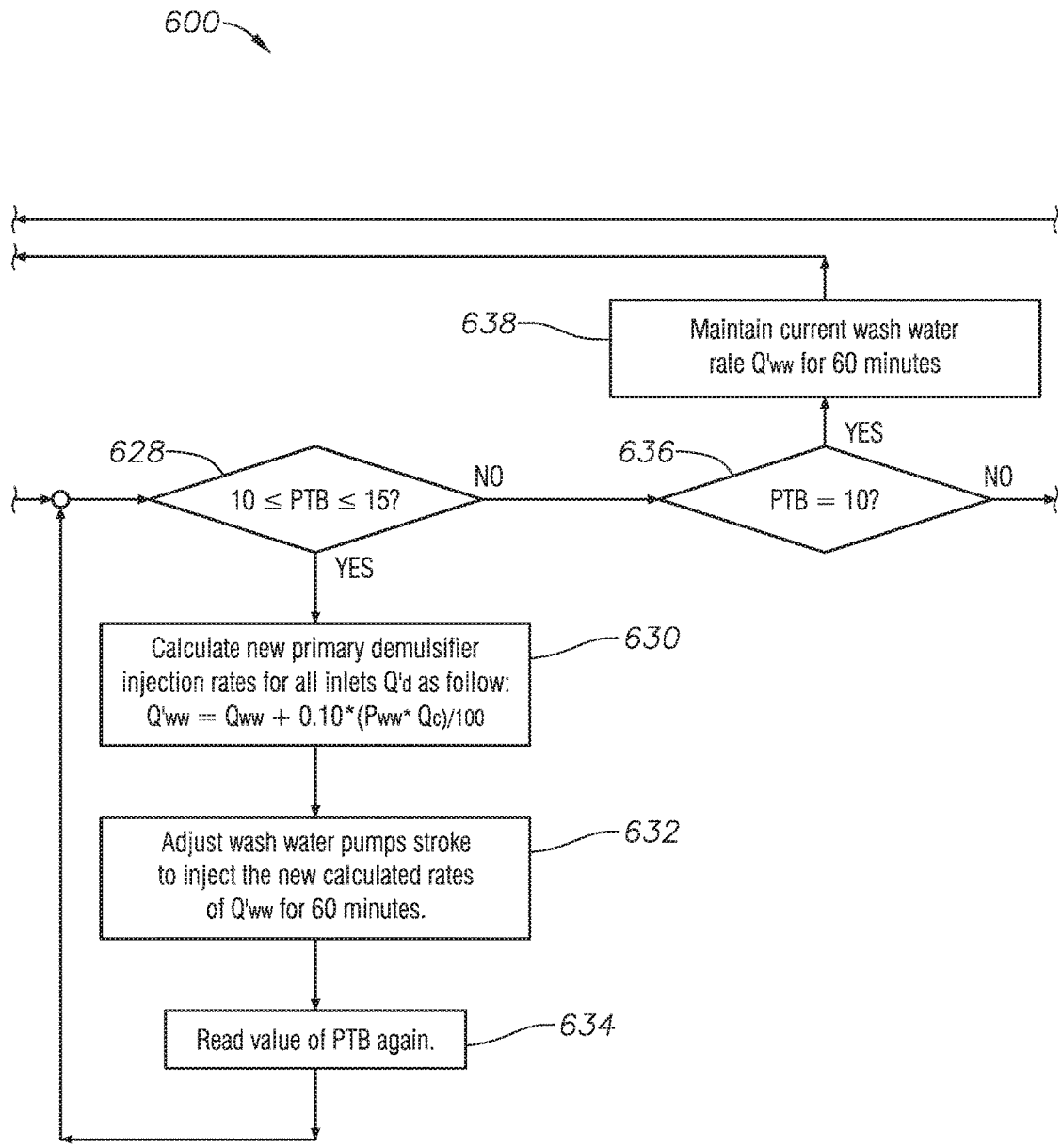
Figure 6C:
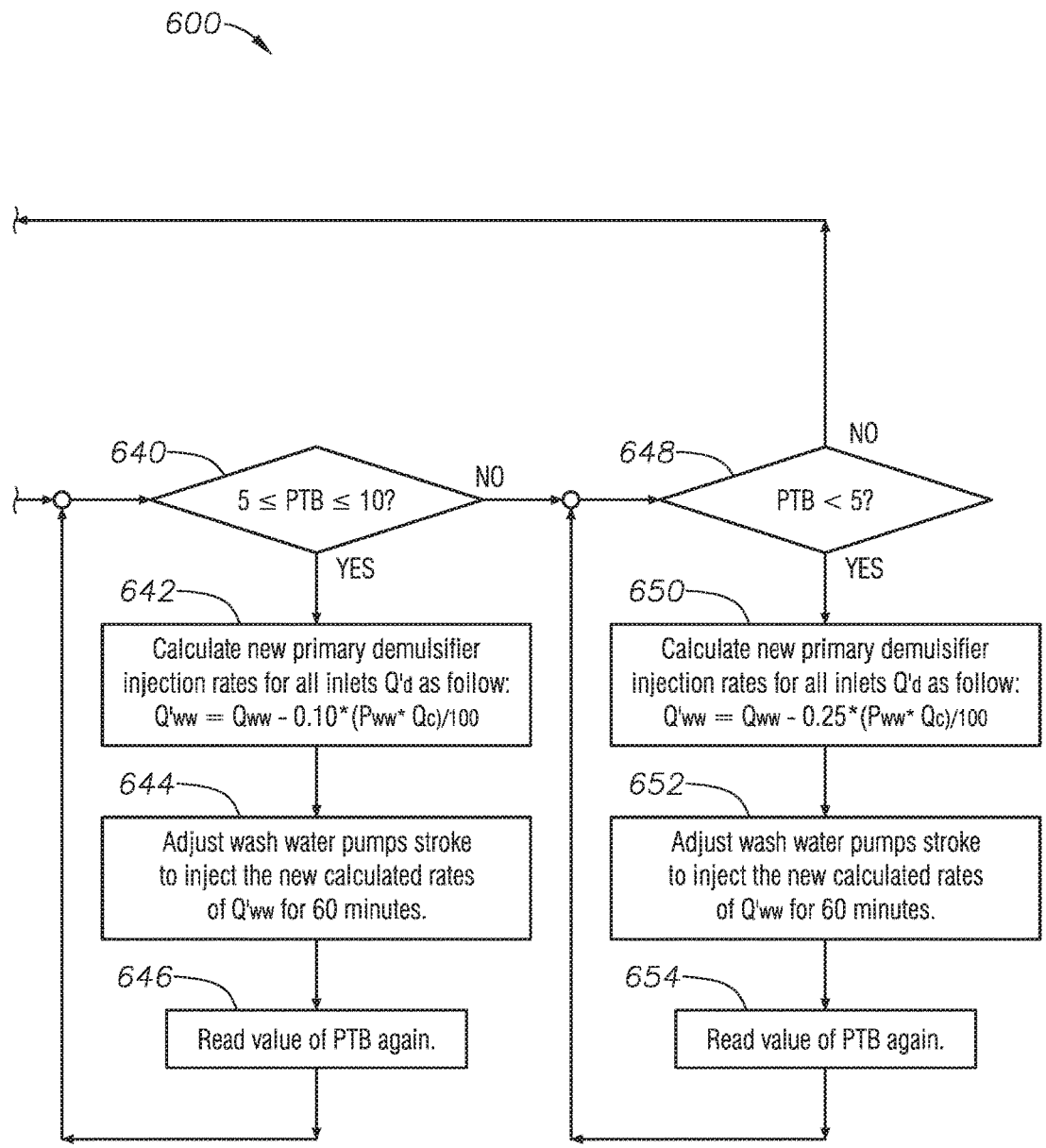

FIGS. 6A-C illustrate another method for optimizing wash water rate in a GOSP, according to one or more example embodiments. The method includes reading a wash water percentage rate for a crude inlet to the plant at step 602, reading a crude flow rate from a desalter outlet of the plant at step 604, reading a first wash water rate for the crude inlet to the plant at step 606, reading a current value of salt content at either the desalter outlet or an export crude outlet of the plant at step 608, and determining whether the current value of the salt content is within a predetermined range, for example greater than 20, at steps 656, 620, 628, 636, 640, 648. If the current value is not within the predetermined range, then the method includes determining a second wash water rate based on the first wash water rate, the wash water percentage rate, and the crude flow rate at steps 622, 630, 642, 650, causing to modify a wash water valve opening to inject the wash water at the second wash water rate at steps 624, 632, 644, 652, and reading the value of PTB again at steps 626, 634, 646, 654.

If the current value is at set point, then the system maintains the current wash water rate for a predetermined period of time at step 638. If at step 656 it is determined that the PTB value is within the predetermined range, then the system determines a third wash water rate based on the first wash water rate, the wash water percentage rate, and the crude flow rate at step 610, causing to modify a wash water valve opening to inject the wash water at the second wash water rate at step 612, and reading the value of PTB again at step 614. After performing this operation, the system checks again to see that the PTB is within the predetermined range, if it is, then the system repeats steps 610, 612 with different values in steps 616, 618, and in case the current value is not within the predetermined range, then the process flow goes back to step 656 for execution.

Figure 7:
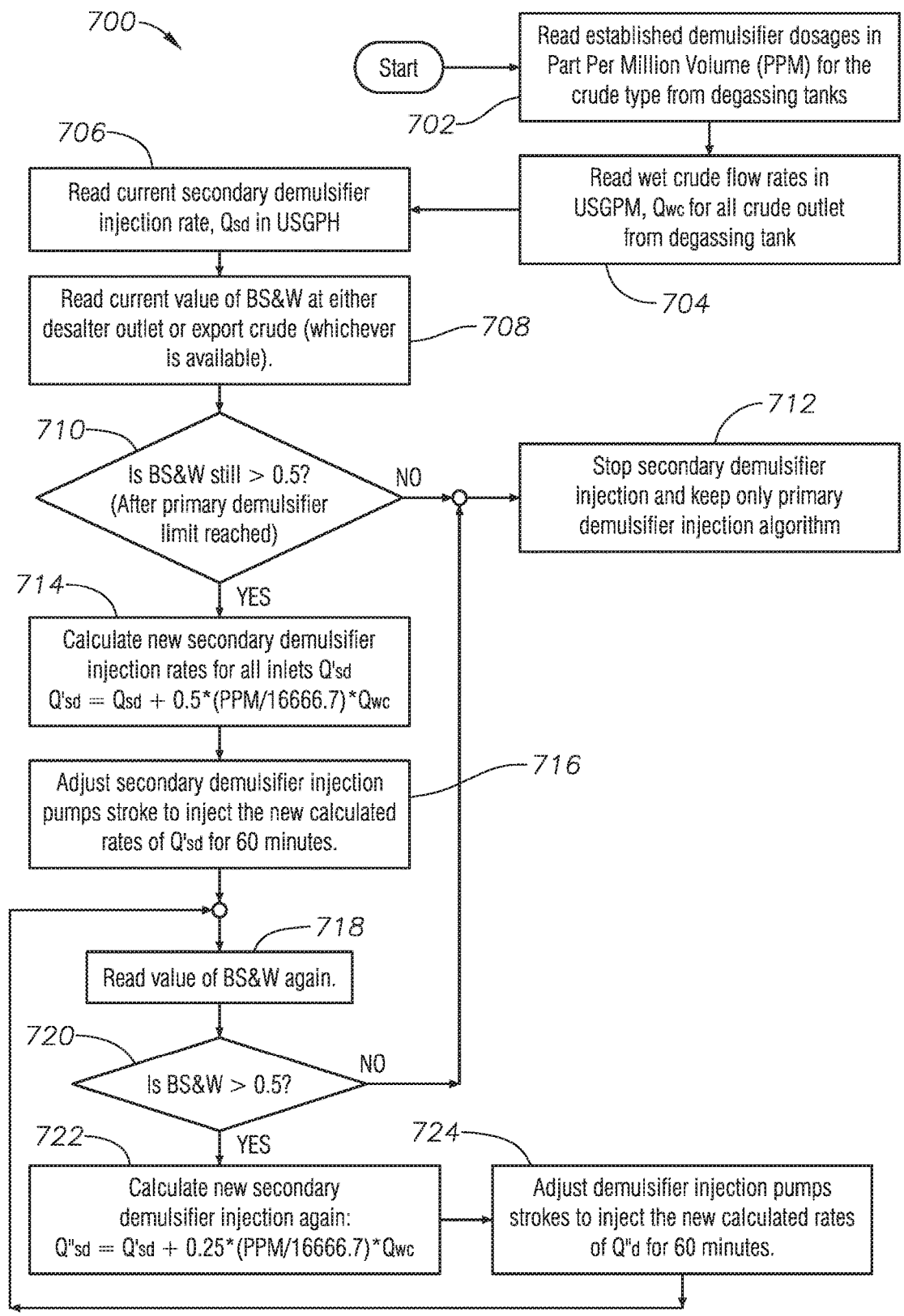
FIG. 7 is a flow diagram illustrating example steps in a method for optimizing secondary demulsifier injection rate in a GOSP, according to one or more example embodiments of the disclosure.

FIG. 7 illustrates example steps that may be executed either in continuation or in parallel, as an alternative or in addition, to the steps illustrated in FIG. 5. Method 700 includes reading the demulsifier dosage rate for a crude type from a degassing tank at step 702, reading the wet crude flow rate for a crude outlet from the degassing tank at step 704, reading a first secondary demulsifier injection rate for the degassing tank at step 706, reading a current value of basic sediment and water (BS&W) at either a desalter outlet or an export crude outlet of the plant at step 708, determining if the current value of basic sediment and water (BS&W) is within a predetermined range, for example greater than 0.5, in step 710. If it is determined that it is within a predetermined range, then the method include determining a second secondary demulsifier injection rate based on the first secondary demulsifier injection rate, the demulsifier dosage rate, and the wet crude flow rate at step 714, causing to modify a secondary demulsifier injection pump stroke to inject the secondary demulsifier at the second secondary demulsifier injection rate at step 716, and reading the current value of BS&W again at step 718. If at step 710 it is determined that the value is not within the predetermined range, then the system stops secondary demulsifier injection and keeps only the primary demulsifier injection algorithm at step 712.

The method may also include, similar to steps 710, 714, 716, determining if the current value of basic sediment and water (BS&W) is within a predetermined range, for example greater than 0.5, in step 720. If it is determined that it is within a predetermined range, then the method include determining a third secondary demulsifier injection rate based on the first secondary demulsifier injection rate, the demulsifier dosage rate, and the wet crude flow rate at step 722, causing to modify a secondary demulsifier injection pump stroke to inject the secondary demulsifier at the third secondary demulsifier injection rate at step 724, and returning to step 718.

The implementation of the above described example embodiments in any plant will enable continuous monitoring of the product specifications on that plant's Distributed Control System (DCS) in the central control room. The example embodiments will enable full automating control of injection rates from DCS to achieve product specifications at all times. Both continuous online monitoring of product specifications and automating demulsifier/wash water injection will substantially improve performance of GOSP operation and offers several others benefits to the system such as reduced manpower requirement by eliminating manual adjustment of injection pumps, optimize demulsifier and wash water usage thereby saving operating costs, and it will improve the plant's water removal efficiency and minimize process upsets from insufficient injection.

The Specification, which includes the Summary, Brief Description of the Drawings and the Detailed Description, and the appended Claims refer to particular features (including process or method steps) of the disclosure. Those of skill in the art understand that the invention includes all possible combinations and uses of particular features described in the Specification. Those of skill in the art understand that the disclosure is not limited to or by the description of embodiments given in the Specification.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this invention belongs unless defined otherwise.

As used in the Specification and appended Claims, the singular forms "a," "an," and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced. The verb "operatively connecting" and its conjugated forms means to complete any type of required junction, including electrical, mechanical or fluid, to form a connection between two or more previously non-joined objects. If a first component is operatively connected to a second component, the connection can occur either directly or through a common connector. "Optionally" and its various forms means that the subsequently described event or circumstance may or may not occur. The description includes instances where the event or circumstance occurs and instances where it does not occur.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The systems and methods described herein, therefore, are well adapted to carry out the objects and attain the ends and advantages mentioned, as well as others inherent therein. While example embodiments of the system and method have been given for purposes of disclosure, numerous changes exist in the details of procedures for accomplishing the desired results. These and other similar modifications may readily suggest themselves to those skilled in the art, and are intended to be encompassed within the spirit of the system and method disclosed herein and the scope of the appended claims.

The invention claimed is:

1. A system for optimizing wash water rate in a GOSP (Gas-Oil-Separation Plant) including a control unit, the system comprising:
  a programmable logic controller operatively coupled to the control unit associated with the plant; and
  a non-transitory computer-readable medium in communication with the programmable logic controller and having stored thereon a set of instructions that when executed cause the programmable logic controller to perform operations comprising:
    reading a wash water percentage rate for a crude inlet to the plant;
    reading a crude flow rate from a desalter outlet of the plant;
    reading a first wash water rate for the crude inlet to the plant;
    reading a current value of salt content at either the desalter outlet or an export crude outlet of the plant;
    determining the current value of the salt content is not within a predetermined range;
    determining a second wash water rate based on the first wash water rate, the wash water percentage rate, and the crude flow rate; and
    causing to modify a wash water valve opening to inject the wash water at the second wash water rate.

2. The system of claim 1, wherein the wash water percentage rate is measured in v/v %.

3. The system of claim 1, wherein the predetermined range of salt content is approximately 10 pounds per thousand barrels (PTB).

4. The system of claim 1, wherein the wet crude flow rate is measured in U.S. gallons per minute.

5. The system of claim 1, wherein the crude throughput and the first wash water rate is measured in U.S. gallons per minute.

* * * * *